US010144677B2

(12) United States Patent
Streffer

(10) Patent No.: US 10,144,677 B2
(45) Date of Patent: *Dec. 4, 2018

(54) LIGNIN MATERIALS CONTAINING COMPOSITIONS

(71) Applicant: MAXBIOGAS GMBH, Marienwerder (DE)

(72) Inventor: Friedrich Streffer, Berlin (DE)

(73) Assignee: LXP GROUP GMBH, Marienwerder (DE)

(*) Notice: Subject to any disclaimer, the term of this patent is extended or adjusted under 35 U.S.C. 154(b) by 290 days.

This patent is subject to a terminal disclaimer.

(21) Appl. No.: 14/909,884

(22) PCT Filed: Dec. 10, 2013

(86) PCT No.: PCT/EP2013/076056
§ 371 (c)(1),
(2) Date: Feb. 3, 2016

(87) PCT Pub. No.: WO2015/018464
PCT Pub. Date: Feb. 12, 2015

(65) Prior Publication Data
US 2016/0185675 A1 Jun. 30, 2016

(30) Foreign Application Priority Data
Aug. 6, 2013 (EP) .................. 13179394

(51) Int. Cl.
C05D 1/00 (2006.01)
C05D 3/00 (2006.01)
C05D 5/00 (2006.01)
C05B 17/00 (2006.01)
C05D 9/00 (2006.01)
C05F 11/00 (2006.01)
C08L 97/00 (2006.01)
C08H 8/00 (2010.01)
C05F 7/02 (2006.01)
C05C 11/00 (2006.01)

(52) U.S. Cl.
CPC ............ C05F 11/00 (2013.01); C05B 17/00 (2013.01); C05C 11/00 (2013.01); C05D 1/00 (2013.01); C05D 3/00 (2013.01); C05D 5/00 (2013.01); C05D 9/00 (2013.01); C05F 7/02 (2013.01); C08H 8/00 (2013.01); C08L 97/005 (2013.01)

(58) Field of Classification Search
None
See application file for complete search history.

(56) References Cited

U.S. PATENT DOCUMENTS

| 2,574,027 | A | * | 11/1951 | Farber | C05F 11/00 530/500 |
| 2,663,628 | A | * | 12/1953 | Thomsen | C05B 17/00 71/25 |
| 3,546,200 | A | | 12/1970 | Whalen et al. | |
| 4,735,683 | A | * | 4/1988 | Wong | C01D 5/00 162/14 |
| 5,747,416 | A | * | 5/1998 | McArdle | A01N 25/10 504/115 |
| 2002/0069983 | A1 | * | 6/2002 | Rousu | C05D 1/00 162/29 |
| 2005/0244934 | A1 | * | 11/2005 | Foody | B01B 1/005 435/101 |
| 2007/0095118 | A1 | * | 5/2007 | Evers | C05C 9/00 71/28 |
| 2009/0056707 | A1 | * | 3/2009 | Foody | B01J 39/04 127/46.2 |
| 2011/0247272 | A1 | * | 10/2011 | Cannock | C05D 3/00 47/1.01 R |
| 2015/0101378 | A1 | * | 4/2015 | Ogle | C08L 5/00 71/23 |

FOREIGN PATENT DOCUMENTS

| CN | 102627509 | * | 8/2012 |
| CN | 102659476 | * | 9/2012 |
| WO | WO-2010043424 A1 | | 4/2010 |

OTHER PUBLICATIONS

Chinese Office Action dated Nov. 23, 2017 for corresponding Chinese Application No. 201380078826.3 and English translation.
Liu Z et al: "Separation of lignocellulosic materials by combined processes of pre-hydrolysis and ethanol extraction", Bioresource Technology, Elsevier BV, GB, vol. 102, No. 2, Jan. 1, 2011 (Jan. 1, 2011), pp. 1264-1269, XP027581441.
T Radoykova et al: "Black Liquor Lignin Products, Isolation and Characterization", Journal of Chemical Technology and Metallurgy Journal of Chemical Technology and Metallurgy, Jan. 1, 2013 (Jan. 1, 2013), pp. 524-529, XP055099596.
Garcia et al: "Use of Kraft Pine Lignin in Controlled-Release Fertilizer Formulations", Ind. Eng. Chem. Res., Jan. 8, 1996 (Jan. 8, 1996), pp. 245-249, XP055081282.
International Search Report and Written Opinion, PCT/EP2013/076056.

(Continued)

Primary Examiner — Wayne A Langel
(74) Attorney, Agent, or Firm — Polsinelli PC

(57) ABSTRACT

The present invention primarily relates to a preparation comprising or consisting of 40-99.9 wt.-% of lignin, preferably unmodified lignin, 0.1-50 wt.-% of minerals, preferably 0.1-30 wt.-%, 0-25 wt.-% of one or more mono- and oligomeric carbohydrates, preferably 0.1-20 wt.-%, and 0-15 wt.-% of one or more solvents, in particular water, preferably 0.1-4 wt.-%. Furthermore, the present invention relates to a fertilizer comprising or consisting of such a preparation and to the use of such a preparation as fertilizer, as ingredient for a fertilizer or for producing a fertilizer.

17 Claims, No Drawings

(56) References Cited

OTHER PUBLICATIONS

Liu, Zehua et al: "Separation of lignocellulosic materials by combined processes of pre-hydrolysis and ethanol extraction", Bioresource Technology, vol. 102, No. 2, Jan. 1, 2011 (Jan. 1, 2011), pp. 1264-1269.
Notification of the First Office Action (English translation), issued in Chinese Application No. 2013680078826.3 dated Apr. 12, 2017.
Notification of the First Office Action, issued in Chinese Application No. 2013680078826.3 dated Apr. 12, 2017.

* cited by examiner

LIGNIN MATERIALS CONTAINING COMPOSITIONS

CROSS-REFERENCE TO RELATED APPLICATIONS

This application is a national stage application (under 35 U.S.C. § 371) of PCT/EP2013/076056, filed Dec. 10, 2013, which claims benefit of European Application No. 13179394.5, filed Aug. 6, 2013, which are incorporated herein by reference in their entireties.

The present invention relates to a preparation containing lignin, which is obtainable by a method for recovering lignin (and, optionally, minerals) from a slurry after the bulk of cellulose and hemicellulose has been removed from a lignocellulosic biomass. The invention further relates to a fertilizer comprising or consisting of such a preparation and to the use of such a preparation as a fertilizer or for producing a fertilizer.

Pulping processes have previously been used to separate cellulose from lignin and other components of lignocellulose containing materials. For example, various types of inorganic chemicals in water have been used to modify lignin to render it water soluble. In the last decade various methods have been proposed to produce regenerated cellulose and hemicellulose while keeping the more or less unmodified lignin in solution and hence separate the cellulose/hemicellulose and the lignin by means of a solid/liquid separation. The solution system of the resulting slurry consists of a cellulose/hemicellulose solvent and a cellulose/hemicellulose precipitant and contains besides the lignin usually a substantial part of the minerals introduced into the process.

Recovering the lignin as well as the minerals from pulping processes is desirable for various reasons. First of all lignin is one of the few abundant providers of aromatic structures in nature rendering it valuable for chemical industry. Current research efforts focus on how unmodified lignin may be used. One example is the oxidation to vanillin. New investigations have shown that it is possible to produce carbon fibers in a reasonable quality and with a high market value from lignin, but the carbohydrate and sulfur content has to be very low. Secondly, lignin is the precursor for humus, the main factor controlling the water, carbon and mineral household of soil, providing a substantial value to agriculture. The importance of carbon- and mineral cycle closure has been recognized again in the last decades. And thirdly, lignin may act as a carbon dioxide sink, because it is degraded only very slowly and if kept anoxic and dry it is stable. Under suitable conditions it is converted to coal over time.

Furthermore, it is desirable to completely remove and/or recover the solvents and precipitants used in pulping processes as they may be expensive and/or ecologically harmful, which is detrimental to further uses of the products obtained from a pulping process.

A preferred method for digesting a biomass comprising lignin together with cellulose and/or hemicellulose comprises the following steps (cf. for example WO 2010/043424 A1):

First, the biomass is contacted with a solvent for dissolving the cellulose and/or the hemicellulose. This is preferably done at a temperature below 120° C. and below a pressure of 300 kPa for less than 4 hours. Secondly, the dissolved cellulose and/or hemicellulose are precipitated by contacting it/them with a precipitant to form a compact solid comprising cellulose and/or hemicellulose as well as possibly residual lignin. The precipitant may be selected from the group consisting of alkanes, ethers, and esters or a mixture of these and the precipitation is preferably performed at a temperature below 120° C. and at a pressure of below 300 kPa for less than 30 min. Thirdly, the precipitate may be contacted with a solvent for dissolving the lignin in the precipitate. This step can also be performed when precipitating the cellulose and/or hemicellulose.

The ratio of the solvent for dissolving the cellulose and/or the hemicellulose to the biomass may be about 5:1 (weight/weight), but can also be greater. The volumetric ratio of the solvent for dissolving the cellulose and/or the hemicellulose and the precipitant for precipitating cellulose and/or hemicellulose may range between 1:1 to 1:3 (volume/volume).

The biomass may be placed in a suitable container, in particular a reactor. As lignocellulose containing biomass, wood (hard or soft), forest trimmings, leaves, recycled paper, waste paper, paper waste, corn strover, corn fiber, wheat straw, rice straw, rye straw, sugarcane bagasse, sugar beet cuttings, switchgras, bamboo, pulp and/or similar organic materials can be used. The lignocellulose containing material may be reduced in particle size to pieces of 1 cm or less and further treated, e.g. it may be washed and/or its water content is changed by means known to a person of skill in the art.

The solvent for dissolving the cellulose and/or the hemicellulose which is added to the biomass in the reactor can be an inorganic acid, an inorganic hydroxide, an ionic solution, an organic acid and water or a mixture of any of these (Klemm, 1998: Klemm, D., Philipp, B., Heinze, T., Heinze, U, Wagenknecht, U Comprehensive Cellulose Chemistry Vol. I, Weinheim, VCH-Wiley 1998).

The mixture of biomass and solvent may be stirred at a temperature between 30° C. and 90° C., but the temperature need not to be constant. The pressure is at normal ambient pressure, but may be varied. After 10 to 90 minutes, at least 60% of the cellulose and hemicellulose are dissolved, depending on the kind of biomass and the solvent used. The incubation time may be extended such that practically all of the cellulose and hemicellulose in the reactor is dissolved.

After completion of the cellulose/hemicellulose digestion as described above, the reaction is stopped using a precipitant for precipitating the cellulose and hemicellulose, thereby forming a compact solid (precipitate). A precipitant may be chosen from alkanes, ethers and/or esters or a mixture of these, which do not swell or only modestly swell cellulose. The liquid retention value (LRV) for the precipitant may be smaller than the LRV of water for the cellulose used, wherein the LRV is defined according to Klemm, 1998, page 237, as follows:

$$LRV\ (\%) = (\text{Mass of moist sample} - \text{Mass of dry sample}) \times 100 / \text{Mass of dry sample}$$

The volumetric ratio of the solvent and the precipitant is 1:1 to 1:3, reducing the solvent amount needed for this and the following step. For this step, the conditions of temperature and pressure are considered of minor importance. Therefore temperature and pressure may be maintained from the previous step. Subsequently, the solid and the liquid phase are separated from each other.

After the precipitate containing the bulk of the cellulose and hemicellulose is removed, the remaining slurry contains the solvent for dissolving the cellulose and/or the hemicellulose (from now on called the "cellulose solvent"), the precipitant for precipitating the cellulose and/or hemicellulose (from now on called the "cellulose precipitant") as well as lignin and minerals, both of which are for the most part dissolved. The mixture may also comprise residual cellulose and/or hemicellulose as well as hydrolysation products thereof.

Further aspects of a preferred method for digesting a biomass comprising lignin together with cellulose and/or hemicelluloses can be derived from WO 2010/043424 A1, the content of which is herewith incorporated in its entirety.

A primary objective of the present invention was to provide a preparation containing lignin, preferably together with minerals, which can be obtained in a cheap and energy efficient way.

A further objective of the present invention was to provide a preparation containing lignin, preferably together with minerals, which comprises minimal residual amounts of solvents and/or carbohydrates.

Yet another objective of the present invention was to provide a preparation containing lignin, preferably together with minerals, which comprises a suitable amount of nutrients to be used as a fertilizer or to produce a fertilizer.

The objectives of the present invention as set out above are met by a preparation comprising or consisting of
  40-99.9 wt.-% of lignin, preferably unmodified lignin,
  0.1-50 wt.-% of minerals, preferably 0.1-30 wt.-%
  0-25 wt.-% of one or more mono- and oligomeric carbohydrates, preferably 0.1-20 wt.-% and
  0-5 wt.-% of one or more solvents, in particular water, preferably 0.1-4 wt.-%
preferably
  60-99 wt.-% of lignin,
  1-20 wt.-% of minerals,
  0-10 wt.-% of mono. and oligomeric carbohydrates, preferably 0.1-5 wt.-%, and
  0-3 wt.-% of one or more solvents, preferably 0.1-2 wt.-%
particularly preferably
  70-99 wt.-% of lignin,
  1-10 wt.-% of minerals,
  0-3 wt.-% of mono. and oligomeric carbohydrates, preferably 0.1-2 wt.-% and
  0-0.5 wt.-%, preferably 0.1-0.5 wt.-% of one or more solvents.

A preparation according to the invention contains lignin as major component and can efficiently be obtained without the need to modify the lignin chemically.

Preferably, the preparation according to the invention contains minerals in an amount suitable to provide nutrition value for an agricultural application.

Further preferably, the amount of mono- and oligomeric carbohydrates in a preparation according to the invention is low so that a minimal amount of $CO_2$ is generated when the preparation is subjected to combustion. Advantageously, a preparation according to the invention can therefore be used as a clean energy source.

It is furthermore preferred that the amount of solvents in a preparation according to the invention is low, so that the release of ecologically harmful and toxic compounds into the environment is minimal when a preparation according to the invention is used as energy source or in an agricultural application.

A preparation according to the invention may comprise one or more components selected from the group hydrolysation products of cellulose and/or hemicellulose, in particular xylose.

Among the hydrolysation products of cellulose and/or hemicellulose, which may be present in a preparation according to the present invention, xylose is in general the most abundant.

A preparation according to the invention may comprise a total amount of solvent(s) of less than 3 wt.-% preferably less than 2 wt.-%, particularly preferably less than 0.5 wt.-%, based on the total weight of the preparation, or it may not comprise any solvent at all.

It is preferred, that a preparation according to the invention contains a minimal amount of solvents, especially ecologically harmful or toxic (organic) solvents, which may release $CO_2$ or other undesirable compounds into the environment. A preparation according to the present invention may therefore safely be used as an energy source or for agricultural applications.

Furthermore, a preparation according to the invention may comprise a total carbohydrate content of less than 3 wt.-%, preferably less than 1 wt.-%, particularly preferably less than 0.5 wt.-%.

Preferably, the content of (residual) carbohydrate(s) in a preparation according to the invention is low, so that the amount of $CO_2$, which can be generated from the preparation is minimized. By reducing the carbohydrate content, an environmentally safe application of the preparation can be facilitated.

In a preferred preparation according to the invention, one, more or all of the minerals is/are selected from the group consisting of salts comprising or consisting of $K^+$, $Na^+$, $Ca^{2+}$, $Mg^{2+}$, $Cl^-$, $PO_4^{3-}$ and $SO_4^{2-}$.

Advantageously, the mineral composition naturally contained in typical pulping slurry provides a suitable nutritional value for an agricultural application of a preparation according to the invention and the application contributes to close the mineral cycle. Thus, by isolating the lignin together with the minerals from pulping slurry, a suitable mineral composition is obtained without additional enrichment or removal of certain mineral components.

In a further preferred preparation according to the invention the content of
  N is in the range of 0.1-15 wt.-%, preferably in the range of 0.1-5 wt.-%, particularly preferably in the range of 0.1-3 wt.-%, and/or
  S is in the range of 0.1-5 wt.-%, preferably in the range of 0.1-3 wt.-%, particularly preferably in the range of 0.1-1 wt.-%, based on the total weight of the preparation.

Furthermore, in a preferred preparation according to the invention the content of P is in the range of 0.1-10 wt.-%, preferably in the range of 0.1-5 wt.-%, particularly preferably in the range of 0.1-3 wt.-% based on the total weight of the preparation.

A preparation according to the invention advantageously provides the major essential nutrients for agricultural application in a suitable amount without the need of further additions.

A preparation according to the invention is obtained or obtainable by a method for isolating lignin, preferably unmodified lignin, and, optionally, minerals from a mixture, in particular a pulping slurry (preferably a mixture or, respectively, a pulping slurry obtained by a method as described in WO 2010/043424 A1), containing lignin, a cellulose solvent, a cellulose precipitant, minerals and optionally (residual) cellulose and/or hemicellulose and/or hydrolysation products thereof, comprising or consisting of the following steps:
i) removing the cellulose precipitant from the mixture,
ii) contacting the mixture with a lignin precipitant, preferably at a temperature below 50° C., to obtain a precipitate,
iii) removing the precipitate obtained in step ii) from the mixture, iv) optionally washing the precipitate with a lignin precipitant, v) removing the lignin precipitant from the precipitate, vi) optionally separating the cellulose solvent and the lignin precipitant from the remaining mixture obtained in step iii), with the proviso that in case the cellulose precipitant is the same as the lignin precipitant used in step ii) or contains one or more components of the mixture used as lignin precipitant in step ii), step i) is optional only, i.e. step i) can be omitted.

Advantageously, in step i) of the method described above, the cellulose precipitant is removed from the mixture, while the lignin and minerals largely remain dissolved. The method provides an energy efficient, cheap and easy way to obtain a preparation according to the invention.

The present invention further relates to a fertilizer comprising or consisting of a preparation as described above.

The application of a preparation as fertilizer is ecologically very valuable as it contributes to close the carbon and mineral cycle.

Therefore the present invention furthermore relates to the use of a preparation as described above as fertilizer, as ingredient for a fertilizer or for producing a fertilizer.

Moreover, further uses of a preparation according to the invention include the production of carbon fiber or polyurethanes as well as an energy source in a combustion process.

The following examples are added to illustrate the subject-matter of the invention, without limiting the scope of protection.

Example 1: Method for Digesting Lignocelluloses Containing Biomass Using a Cellulose Solvent and a Cellulose Precipitant (To Obtain a Pulping Slurry)

Lignocellulose containing biomass in the form of 50 g of coarsely grained wheat straw was stirred with 300 ml 80% $H_3PO_4$ as cellulose solvent at 55° C. for 45 min to the complete solution of the straw. The black viscous medium was cooled to approx. 40° C. and then mixed vigorously with 600 ml of pre-cold MtB ether (methyl-tert. butylether) as a precipitant to give a compact precipitate of cellulose/hemicellulose. The solid phase was removed from the slurry.

Example 2: Method for Digesting Lignocelluloses Containing Biomass Using a Cellulose Solvent and a Cellulose Precipitant in Combination with a Lignin Solvent (To Obtain a Pulping Slurry)

Lignocellulose containing biomass in the form of 30 g solid biogas digestate were mixed with 200 ml 80% $H_3PO_4$ as cellulose solvent and stirred at 50° C. for 40 min. The solution is precipitated with 1 l pre-cold mixture of ethanol/acetone as precipitant with a ratio of 3:1. The solid phase (the precipitate) was separated by centrifugation and the supernatant was collected.

Example 3: Method to Obtain a Preparation According to the Invention From a Pulping Slurry Obtained According to Example 1 i) The organic cellulose precipitant was removed under reduced pressure of 400 mbar from the collected supernatant of example 1 to give a black viscous solution, which was cooled to 40° C.

ii) 10 ml of the black solution was mixed vigorously with 50 ml ethyl acetate, which readily formed a brown precipitate.

iii) The brown precipitate was filtered of. The filtrate was collected for later treatment.

iv) The solids were suspended in another 50 ml ethyl acetate and filtered again. The filtrate was collected for later use in a step ii).

v) The brown solids were dried at 65° C.

vi) The ethyl acetate was removed from the phosphoric acid by distillation leaving approx. 8 ml.

The regenerated acid of step vi) was able to dissolve 1.5 g of straw.

The carbohydrate and ash content of the solids of step v) were determined as well as the element composition of to confirm that the brown precipitate was lignin.

| Parameter | % of dry weight |
| --- | --- |
| Sample weight | 217 mg |
| Ash | 5% |
| Carbohydrate | 0.9% |
| Lignin | 90% |
| Elementary analysis: | |
| C | 64.8% |
| H | 4.5% |
| O | 28.8% |
| N | 0.8% |
| S | 0.4% |

Example 4: Method to Obtain a Preparation According to the Invention From a Pulping Slurry Obtained According to Example 2 i) The organic cellulose precipitant was removed under reduced pressure of 500 mbar from the collected supernatant of example 2 to give a black viscous solution, which was cooled to 40° C.

ii) 20 ml of the black solution was mixed vigorously with 40 ml di-propyl ether, which readily formed a brown precipitate.

iii) The brown precipitate was filtered of. The filtrate was collected for later treatment.

iv) The solids were suspended in another 40 ml di-propyl ether and filtered again. The filtrate was collected for later use in a step ii). The brown solids were washed with 20 ml hot water.

v) The brown solids were dried at 65° C.

vi) The di-propyl ether was removed from the phosphoric acid by distillation leaving approx. 17 ml.

The regenerated acid of step vi) was able to dissolve 2.5 g of straw.

The carbohydrate and ash content of the solids of step v) were determined.

| Parameter | % of dry weight |
| --- | --- |
| Sample weight | 750 mg |
| Ash | 18% |
| Carbohydrate | <0.1% |
| Lignin | 81% |
| Elementary analysis: | |
| C | 62.5% |
| H | 5% |
| O | 29% |
| N | 1% |
| S | 0.2% |

The invention claimed is:

1. A preparation comprising:
   60-99 wt.-% of unmodified lignin, and
   1-20 wt.-% of minerals,
   and further comprising:
   0.1-2 wt.-% of one or more mono- and oligomeric carbohydrates, and/or
   0.1-2 wt.-% of one or more solvents;
   wherein the preparation is essentially free of cellulose and hemicellulose.

2. The preparation according to claim 1, wherein the preparation further comprises one or more components selected from the group consisting of hydrolysation products of cellulose and/or hemicellulose.

3. The preparation according to claim 1, wherein the preparation comprises a total carbohydrate content of less than 3 wt.-%.

4. The preparation according to claim 1 wherein one, more than one, or all of the minerals is/are selected from the group consisting of salts comprising $K^t$, $Na^+$, $Ca^{2+}$, $Mg^{2+}$, $Cl^-$, $PO_4^{3-}$ and $SO_4^{2-}$.

5. The preparation according to claim 1, wherein the content of
   N is in the range of 0.1-15 wt.-%, and/or
   S is in the range of 0.1-5 wt.-%,
   based on the total weight of the preparation.

6. A preparation according to claim 1, wherein the preparation is obtained by a method for isolating lignin from a mixture comprising lignin, a cellulose solvent, a cellulose precipitant, minerals, and optionally cellulose and/or hemicellulose and/or hydrolysation products thereof, comprising the following steps:
   i) removing the cellulose precipitant from the mixture,
   ii) contacting the mixture with a lignin precipitant to obtain a precipitate,
   iii) removing the precipitate obtained in step ii) from the mixture,
   iv) optionally washing the precipitate with a lignin precipitant,
   v) removing the lignin precipitant from the precipitate,
   vi) optionally separating the cellulose solvent and the lignin precipitant from the remaining mixture obtained in step iii)
   with the proviso that in case the cellulose precipitant is the same as the lignin precipitant used in step ii) or contains one or more components of the mixture used as lignin precipitant in step ii), step i) is optional only.

7. Fertilizer comprising a preparation according to claim 1.

8. The preparation according to claim 1 comprising:
   0.1-2 wt.-% of one or more solvents.

9. A preparation according to claim 1 comprising:
   70-99 wt.-% of lignin,
   1-10 wt.-% of minerals,
   0.1-2 wt.-% of mono. and oligomeric carbohydrates, and
   0.1-0.5 wt.-% of one or more solvents.

10. The preparation according to claim 1, wherein the preparation comprises xylose.

11. The preparation according to claim 1, wherein the content of
    N is in the range of 0.1-5 wt.-%, and/or
    S is in the range of 0.1-3 wt.-%,
    based on the total weight of the preparation.

12. The preparation according to claim 1, wherein the content of
    N is in the range of 0.1-3 wt.-%, and/or
    S is in the range of 0.1-1 wt.-%,
    based on the total weight of the preparation.

13. The preparation according to claim 1, wherein the one or more solvents comprise water.

14. The preparation according to claim 9, wherein the one or more solvents comprise water.

15. A preparation according to claim 5 comprising xylose.

16. A preparation according to claim 9 comprising xylose.

17. Fertilizer comprising a preparation according to claim 9.

* * * * *